United States Patent [19]
Kuwayama et al.

[11] Patent Number: 5,363,220
[45] Date of Patent: Nov. 8, 1994

[54] DIFFRACTION DEVICE

[75] Inventors: Tetsuro Kuwayama, Yokohama; Naosato Taniguchi, Atsugi; Yoko Yoshinaga, Machida; Nobuo Kushibiki, Yamato, all of Japan

[73] Assignee: Canon Kabushiki Kaisha, Tokyo, Japan

[21] Appl. No.: 1,405

[22] Filed: Jan. 7, 1993

Related U.S. Application Data

[63] Continuation of Ser. No. 360,143, Jun. 1, 1989, abandoned.

[30] Foreign Application Priority Data

Jun. 3, 1988 [JP] Japan .................................. 63-135635

[51] Int. Cl.$^5$ .......................... G02B 5/18; G02B 5/32
[52] U.S. Cl. ......................................... 359/3; 359/15; 359/566; 359/569; 359/13
[58] Field of Search .............. 350/3.6, 3.61, 3.7, 350/3.72, 3.77, 174; 340/705; 359/3, 13, 15, 19, 34, 124, 630, 633, 130, 566, 569, 571, 572, 576; 385/37; 430/1

[56] References Cited

U.S. PATENT DOCUMENTS

| | | | |
|---|---|---|---|
| 4,111,524 | 9/1978 | Tomlinson, III | 359/124 |
| 4,201,441 | 5/1980 | Matsumoto et al. | |
| 4,387,955 | 6/1983 | Ludman et al. | 359/124 |
| 4,613,200 | 9/1986 | Hartman | 350/3.7 |
| 4,759,594 | 7/1988 | Bond et al. | 350/3.61 |
| 4,791,039 | 12/1988 | Ishitsuka et al. | 350/3.61 |
| 4,824,193 | 4/1989 | Maeda et al. | 359/15 |
| 4,832,427 | 5/1989 | Nanba et al. | 350/3.7 |
| 4,871,411 | 10/1989 | Kushibiki et al. | 350/3.61 |
| 4,908,285 | 3/1990 | Kushibiki et al. | 350/3.61 |
| 4,946,533 | 8/1990 | Kushibiki et al. | 350/3.61 |
| 4,970,129 | 11/1990 | Ingwall et al. | 350/3.6 |
| 5,089,903 | 2/1992 | Kuwayama et al. | 359/15 |

FOREIGN PATENT DOCUMENTS

| | | |
|---|---|---|
| 268357 | 5/1988 | European Pat. Off. |
| 61-180209 | 8/1986 | Japan ........................... 359/34 |
| 8701211 | 2/1987 | WIPO . |

OTHER PUBLICATIONS

Kompfner et al; "Holographic Couplers for Opticl Fiber Bundles", University of Oxford, 1975 pp. 79–127.
Popov et al; "Optics Communications", vol. 15, No. 2, Jan. 15, 1988, pp. 97–100.
Jannson et al, "Low–Dispersion Holographic Mirrors with Very High Diffraction Efficiency", 1984 Annual Meeting, Optical Society of America, Abstract Wk 8, p. 1257.

*Primary Examiner*—Ricky D. Shafer
*Attorney, Agent, or Firm*—Fitzpatrick, Cella, Harper & Scinto

[57] ABSTRACT

The present invention provides a diffraction device having a high diffraction efficiency with respect to a wide-band radiation beam. A diffraction device comprises a substrate and a diffraction grating formed on the substrate, wherein the diffraction grating is formed so that a full-width of wavelength at half maximum of a diffraction efficiency of a beam diffracted by the diffraction grating is not less than about 8% of a value of a center wavelength of the diffracted beam.

13 Claims, 6 Drawing Sheets

DIFFRACTION DEVICE

This application is a continuation of application Ser. No. 07/360,143, filed Jun. 1, 1989, now abandoned.

BACKGROUND OF THE INVENTION

The present invention relates to a diffraction device and, more particularly, to a diffraction device for efficiently converting a wide-band radiation beam into a diffraction beam of a predetermined order.

As a conventional diffraction device for reflecting and diffracting incident light and generating reflected/diffracted light in a direction corresponding to a wavelength of the incident light, a surface relief type diffraction grating is frequently used.

FIG. 1 shows a grating shape of a relief type diffraction grating prepared by machine work and its use state. A stepwise grating structure 21 is formed on the surface of a diffraction grating layer 20 on a substrate 19. When monochromatic light 22 is incident in a direction almost perpendicular to the grating surface 21, and a diffracted light beam 23 emerges in a direction almost perpendicular to the grating surface 21, a diffraction efficiency of this diffraction grating is maximized, and a wavelength at this time is called a blazed wavelength.

FIG. 2 shows measurement results of the diffraction efficiency of the diffraction grating. Although there is a slight difference between TE light (solid curve) and TM light (broken curve) depending on a polarized state of incident light, high diffraction efficiencies can be obtained.

When the diffraction grating obtained by machine work is used for a conventional beam splitter, it has excellent characteristics. However, when a reflection type diffraction grating of this type is used in other applications, various problems are posed as in other diffraction gratings.

A case will be examined below wherein the reflection type diffraction grating is disposed on an optical path bending mirror of a head-up display apparatus. In this case, a light beam incident on the diffraction grating and a light beam reflected and diffracted by the diffraction grating have a given spatial range so as to display a two- or three-dimensional image.

As a result, in order to spatially separate the light beam incident on the diffraction grating and the light beam reflected and diffracted by the diffraction grating, a certain angular separation is necessary between the two light beams.

A similar problem is posed when a diffraction grating element is used as an optical communication component. In terms of the arrangement of the entire apparatus, incident light and diffracted light must be spatially separated.

The drawback of the conventional diffraction grating is a decrease in diffraction efficiency when an angle defined by the incident light and the diffracted light is increased. For example, in FIG. 1, when an angle defined by the incident light 22 and the reflected/diffracted light 23 is increased, a certain light component is lost at the corner of the grating inclined surface 21, thus decreasing the diffraction efficiency.

The drawback of the relief diffraction grating obtained by machine work is difficulty in etching the grating on a non-flat surface and in formation of a non-linear grating. When the diffraction grating of this type is used for a spectroscope, the diffraction grating must be formed on a concave surface or the grating itself must have focusing characteristics in order to improve image formation performance of the diffraction grating itself. However, in order to achieve these requirements using machine work, machine control with higher precision than in a normal diffraction grating working technique is required, and this is impossible to achieve in practice.

As a method of solving the problem in machine work, a method of forming a diffraction grating by a holographic exposure method is known. In this method, a substrate coated with a photosensitive material such as a photoresist is exposed with two light beams from a laser to form interference fringes, thus preparing a diffraction grating.

A diffraction grating prepared by the holographic exposure method has many advantages. That is, the diffraction grating can be formed on an arbitrarily curved surface such as a concave surface, convex surface, and the like, and can have various aberration characteristics such as focusing characteristics. However, this diffraction grating prepared by the holographic exposure method has a problem in diffraction efficiency.

FIG. 3 shows diffraction efficiency characteristics of a diffraction grating prepared by the holographic exposure method. The diffraction efficiency has large polarization dependency, and TE light and TM light have different wavelengths corresponding to peak diffraction efficiencies. For this reason, the diffraction grating cannot be effectively utilized except for an optical system using perfectly linearly polarized light.

SUMMARY OF THE INVENTION

It is an object of the present invention to provide a diffraction device which always exhibits a high diffraction efficiency with respect to a wide-band radiation beam. In order to achieve this object, a diffraction device of the present invention has a substrate and a diffraction grating arranged on a substrate, wherein the diffraction grating is arranged so that a full-width at half maximum of a diffraction efficiency of a beam diffracted by the diffraction grating is 8% or more of a center wavelength of the diffracted beam. The diffraction grating can be obtained such that two light beams from a laser are projected on a hologram photosensitive material, interference fringes by the two light beams are formed on the photosensitive material, and the photosensitive material is developed under a proper developing condition. In a preferred aspect of the present invention, a reflection type volume-phase diffraction grating is used as the diffraction grating, and can be formed by the above-mentioned holographic method.

Other features and detailed aspects of the present invention will be apparent from the following embodiment.

DETAILED DESCRIPTION OF THE PREFERRED EMBODIMENTS

Diffraction efficiency characteristics of a volume-phase type diffraction grating as a diffraction device according to a first embodiment of the present invention will be described below with reference to FIG. 4.

Figure 1:
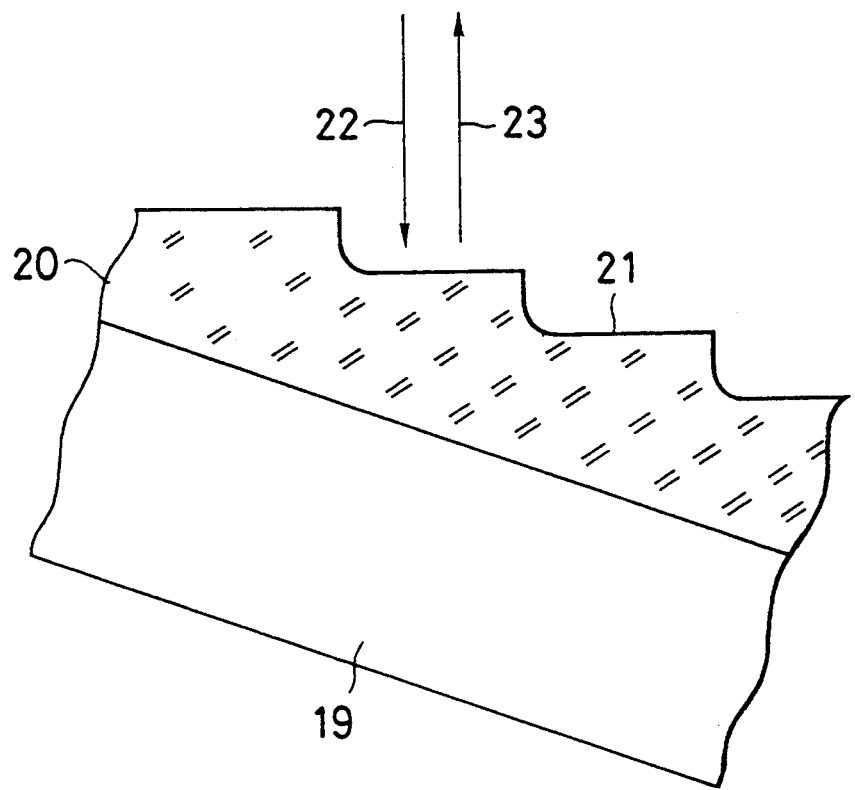
FIG. 1 is a view showing a relief diffraction grating prepared by machine work.
Figure 2:
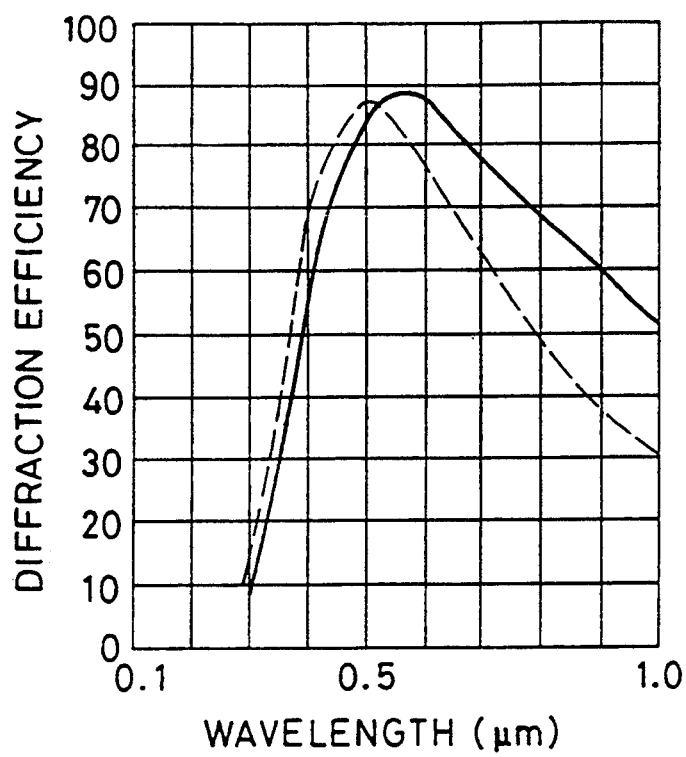
FIG. 2 is a graph showing wavelength characteristics of a diffraction efficiency of the relief diffraction grating.
Figure 3:
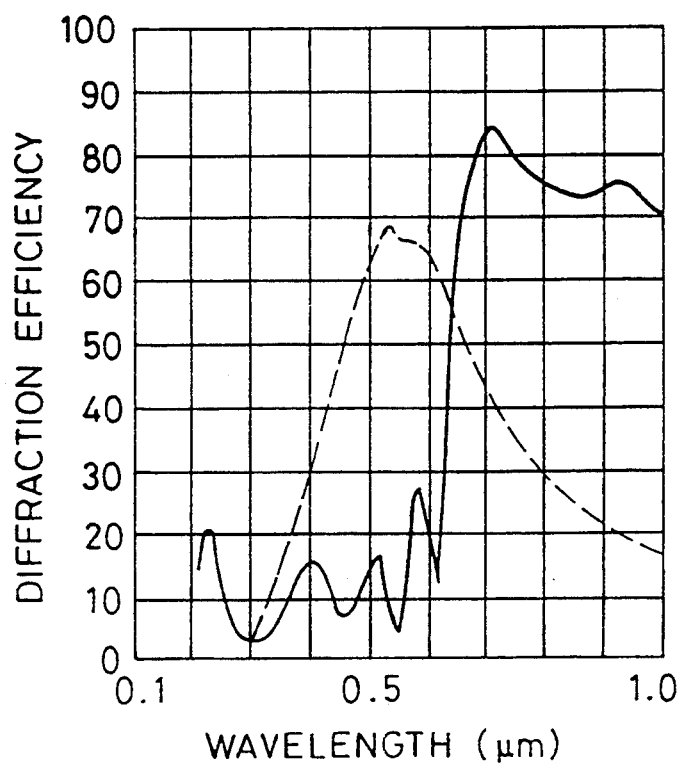
FIG. 3 is a graph showing wavelength characteristics of a diffraction efficiency of a diffraction grating prepared by a holographic method.
Figure 4:
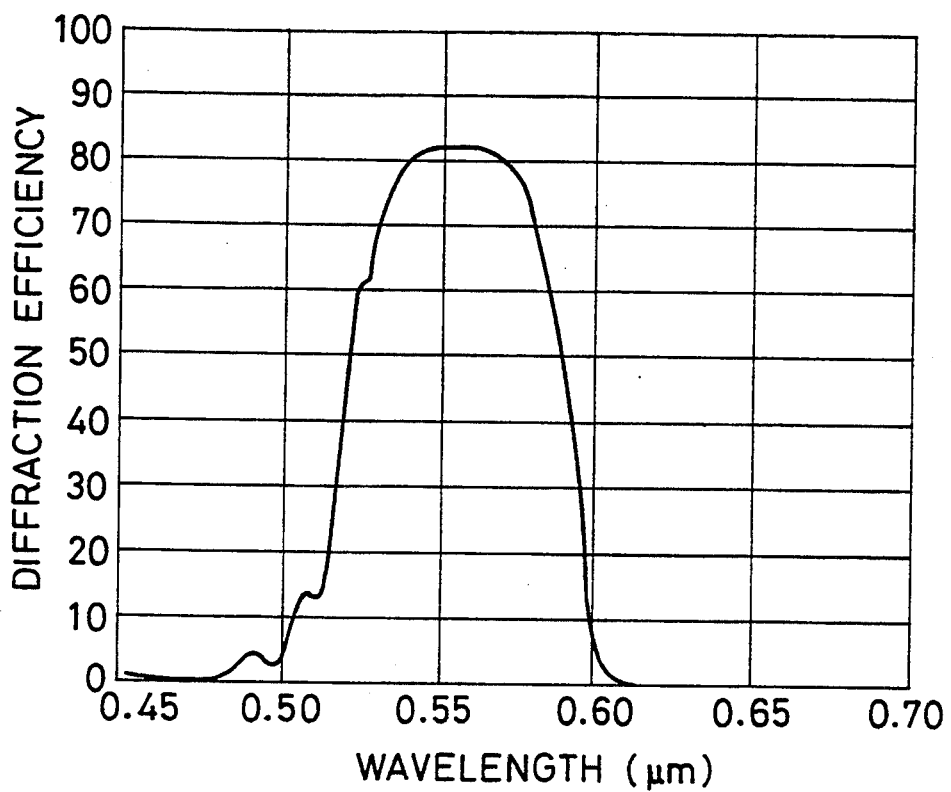
FIG. 4 is a graph showing wavelength characteristics of a diffraction efficiency of a diffraction device according to a first embodiment of the present invention.

FIG. 4 shows measurement results of a diffraction efficiency obtained such that monochromatic light is caused to become incident on the volume-phase type diffraction grating of the diffraction device of the present invention in a direction perpendicular thereto, and an amount of primary reflected/diffracted light components is measured. In FIG. 4, a diffraction efficiency equal to or higher than 80% can be obtained within the range of ±20 nm to have a center wavelength $\lambda_c=555$ nm as the center. To our surprise, since almost no change in diffraction efficiency depending on a polarization direction occurs unlike in FIGS. 2 and 3, the characteristics in FIG. 4 are illustrated by a single curve. As shown in FIG. 4, since the full-width at half maximum of a diffraction efficiency of diffracted light is 65 nm or more, i.e., 8% or more of the value (555 nm) of the center wavelength of the diffracted light, the diffraction device of the present invention exhibits a high diffraction efficiency for a very wide wavelength range.

Figure 5:
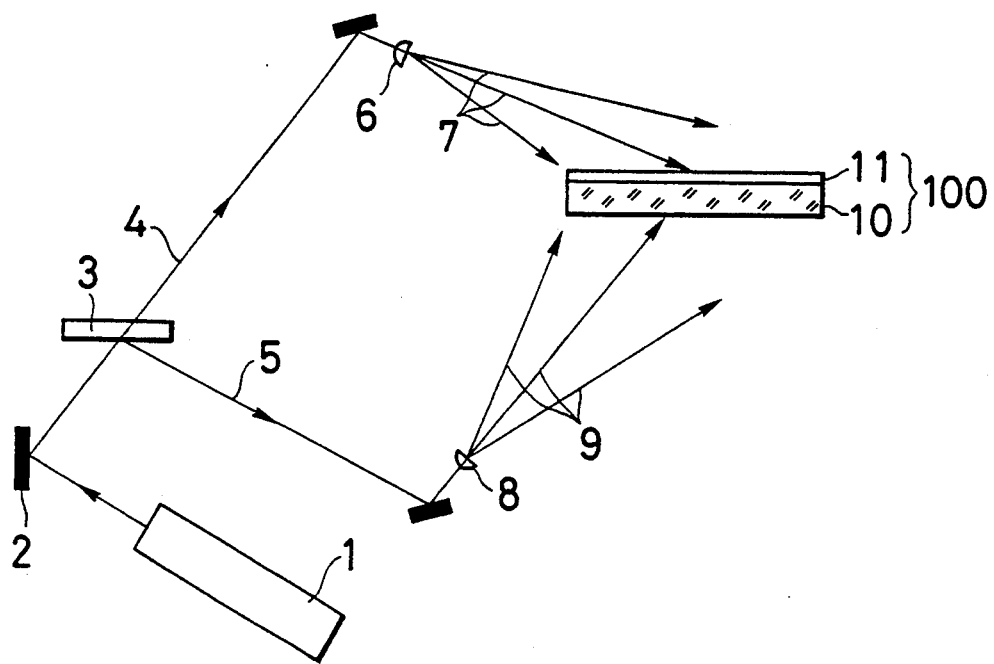
FIG. 5 is a view showing a printing optical system for forming the diffraction device of the present invention by a holographic method.

FIG. 5 is a view showing an optical system for printing the volume-phase diffraction grating of a diffraction device 100 of the present invention having the characteristics shown in FIG. 4.

Light having a wavelength of 488 nm from an argon laser 1 is reflected by a reflecting mirror 2 and is then split by a half mirror 3 into light beams 4 and 5. The light beam 4 passing through the half mirror 3 is diffused by a microscope objective lens 6 to be converted to a light beam 7, and the light beam 7 is incident on a hologram photosensitive material 11 on a substrate 10. On the other hand, the light beam 5 reflected by the half mirror 3 is diffused by a microscope objective lens 8 to be converted to a light beam 9, and the light beam 9 is incident on the hologram photosensitive material 11 through the transparent substrate 10.

These two light beams 7 and 9 interfere with each other in the hologram photosensitive material 11 and form interference fringes. Incident angles of the two light beams with respect to the substrate 10 are selected to be, e.g., 70° and 30°. A parallel light beam or a converged light beam may be used as a printing light beam as needed.

In this embodiment, a polymer as a major component of the hologram photosensitive material 11 is selected from a group consisting of polyvinyl carbazole, and its alkyl- or halogen-substituted derivative. More specifically, examples of the polymer include polyvinyl carbazole, a 3-chlorovinyl carbazole polymer, 3-bromovinyl carbazole polymer, 3-iodovinyl carbazole polymer, 3-methylvinyl carbazole polymer, 3-ethylvinyl carbazole polymer, chlorinated polyvinyl carbazole, brominated polyvinyl carbazole, and the like. Of these polymers, an unsubstituted polyvinyl carbazole is most preferable since it is easily available and a resultant hologram has particularly excellent performance.

The vinyl carbazole-based polymer may be copolymerized with another monomer to control characteristics such as a mechanical strength or flexibility when it is formed as a film, as needed. Examples of the other monomer used in such an application include a vinyl ester such as vinyl acetate, esters of acrylic acid and methacrylic acid, styrene and a styrene derivative, a vinyl-based monomer such as N-vinyl pyrrolidone, N-vinyl phtalimide or the like which can be copolymerized by a copolymerization method using radical polymerization in addition to the above vinyl carbazole group. For example, other polymers such as polystyrene, a styrene-butadiene copolymer, styrene hydrogenated butadiene copolymer, and the like can be blended within a range wherein a hologram image (interference fringes) can be recorded. Note that additional ratios of these materials are selected to obtain desired characteristics.

A polymer component as a major component of the photosensitive material 11 must be activated in advance by an iodine compound with respect to a radiation beam.

The iodine compound coexists in the polymer component to constitute a photosensitive material which has sufficient sensitivity in a visible wavelength range. More specifically, examples of the iodine compounds are those containing carbon tetraiodide, iodoform, ethylene tetraiodido, triiodoethane, tetraiodoethane, pentaiodoethane, hexaiodoethane, and the like as their major components.

The hologram photosensitive material 11 is prepared as follows. That is, the above-mentioned polymer and iodide compound are dissolved in a solvent at a predetermined ratio or are dispersed to prepare a dispersion, and the resultant solution or dispersion is coated on a carrier such as a glass or transparent resin film or is formed into a film by itself.

An interference pattern is exposed by the above method on the vinyl carbazole photosensitive material with the above structure using object light and reference light formed by laser light from an Ar laser or coherent light having a proper wavelength within a wavelength range of 400 nm to 560 nm. Thereafter, the resultant material undergoes a developing process by utilizing swelling and contraction phenomena by a solvent, thus obtaining a volume-phase hologram with a high resolution and a high diffraction efficiency.

With the conventional method, a volume-phase diffraction grating having transparency and a high diffraction efficiency can be formed. However, it is impossible to form a volume-phase diffraction grating having a high diffraction efficiency over a wide wavelength range like in the diffraction device of the present invention.

For the conventional volume-phase diffraction grating, only conditions for a transmission type diffraction grating having high transparency or a reflection type diffraction grating (beam combiner) for a head-up display having high transparency have been studied. Characteristics of the conventional reflection type volume-phase diffraction grating will be described below. When the reflection type volume-phase diffraction grating is prepared using a transparent hologram photosensitive material such as bichromic acid gelatin, polyvinyl carbazole, or the like, the following relationship is approximately established between its full-width at half maximum and center wavelength $\lambda_o$:

$$(\Delta,\lambda)/\lambda_o = d/T$$

where T is the effective thickness of the diffraction grating (hologram), and is the surface pitch of the grating. If the thickness T=6 μm, the center wavelength $\lambda_o$=555 nm, and a mean refractive index=1.65, the grating has the surface pitch d=1.68 nm. As a result, $\Delta\lambda$=16 nm.

In this case, if the thickness of the hologram is decreased to about 2 μm to widen the full-width at half maximum to about 45 nm, since the modulation degree of the refractive index of the hologram photosensitive material is normally as low as $\Delta n$=0.05, the maximum diffraction efficiency is only about 8%. Thus, such a material cannot be put into a practical application.

If the reflection type volume-phase diffraction grating as one diffraction device of the present invention causes light scattering more or less, this does not pose a functional problem, and it is more important to provide a high diffraction efficiency over a wide wavelength range.

As a result of extensive studies, the present inventors found that a reflection type volume-phase diffraction grating which can provide a high diffraction efficiency over a wide wavelength range can be obtained by changing conventional exposure conditions and developing conditions.

The diffraction device of the present invention will be described more in detail by way of its example and a comparative example.

EXAMPLE 1

2.0 g of polyvinyl carbazole, 0.2 g of carbon tetraiodide, and 20 mg of 2,6-di-tert-butylphenol were dissolved in 25 g of monochlorobenzene, and the resultant material was spinner-coated (Mikasa Spinner, 1H-2) on a 1.3-mm thick glass plate with a polished surface in a dark place, and was dried in a dark place to prepare a 6-μm thick hologram photosensitive material layer.

Printing was then performed using the optical. system shown in FIG. 5.

Light beams 7 and 9 were formed by monochromatic (bluish green) light having a wavelength of 0.488 μm from an argon ion laser 1, and a photosensitive material 11 was exposed with the light beams. 7 and 9 at a light amount of 50 mJ/cm².

The exposed photosensitive material was dipped in a trichloroethylene solution at 25° C. for 5 minutes to remove an iodine compound component. Thereafter, the resultant material was dipped in a xylene solution at 36° C. as a swelling solution (first bath) for 60 seconds, and was then dipped in an n-hexane solution at 36° C. as a second bath for 60 seconds. Thereafter, the material was naturally dried. As a result, the volume-phase diffraction grating as the diffraction device of the present invention was obtained.

COMPARATIVE EXAMPLE 1

For the purpose of comparison, a diffraction grating sample of the comparative example was prepared following the same procedures as in Example 1 except that the exposure amount was 6 mJ/cm². The diffraction grating had a peak wavelength of 520 nm, a full-width of wavelength at half maximum of 15 nm, and a peak diffraction efficiency of 50%, i.e., had a sharp peak.

The reflection type volume-phase diffraction grating as the diffraction device of the present invention prepared as described above has advantages which cannot be obtained by those formed by the machine work method and the conventional holographic exposure method.

More specifically, with the reflection type volume-phase diffraction grating of the present invention, various devices which can provide a high diffraction efficiency, i.e., one which is designed to diffract perpendicularly incident light in a 15° direction to one which has a diffraction direction as large as 80°, can be prepared.

More specifically, in a state satisfying the Bragg condition, each light beam can satisfy a positive reflection condition on each surface of the volume-phase diffraction grating, and since layers which overlap in a depth direction serve to enhance reflected/diffracted light, a high diffraction efficiency of 80% or more can be realized with respect to any preset incident angles and reflection/diffraction angles.

The present invention also has advantages of the holographic formation method. That is, a grating can be formed on a curved surface, the grating itself can have focusing characteristics, and the like.

Figure 6:
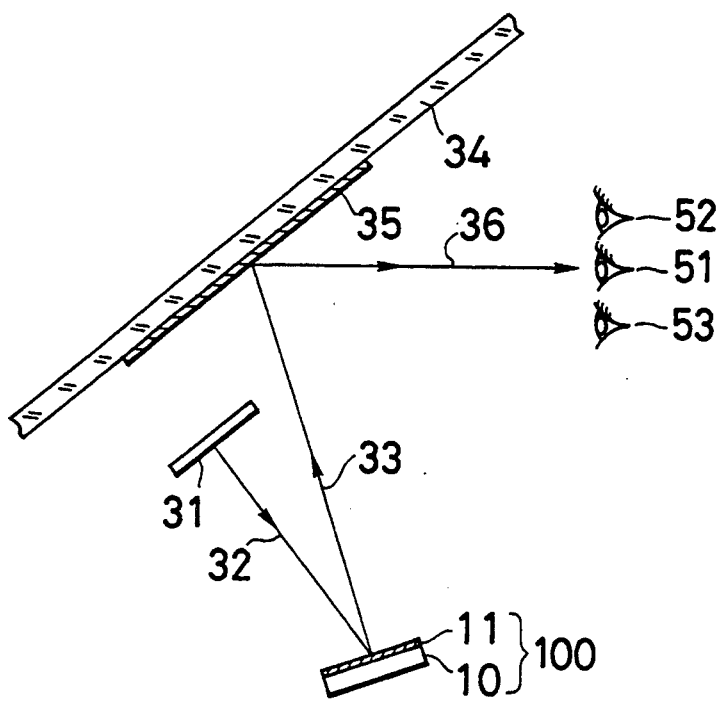
FIG. 6 is a view showing a head-up display apparatus using the diffraction device of the present invention.

FIG. 6 shows a head-up display apparatus for a vehicle using the diffraction device of the present invention. In a diffraction device 100 of the present invention, a light beam 32 from a display element 31 is reflected and diffracted by a volume-phase type diffraction grating (hologram) 11 on a substrate 10. Since the diffraction grating 11 has diffraction characteristic shown in FIG. 4, light components within a wavelength range of 520 nm to 590 nm are effectively diffracted in diffraction directions according to their wavelengths.

A primary diffracted light beam 33 diffracted by the diffraction grating 11 is reflected and diffracted by a reflection type volume-phase type diffraction grating (hologram) 35, or beam combiner, on a transparent substrate 34 to be converted to a primary diffracted light beam 36. The light beam 36 is observed by a pupil 51 of an observer. The diffraction grating 11 has predetermined color dispersion characteristics, and reflects and diffracts a light beam incident from an about 20° direction in a (0°) direction substantially perpendicular thereto, i.e., has a function of canceling color wavelength dispersion caused by the reflection type diffraction grating 35. As a result, a display image by the display element 31 is clearly displayed in air. In this case, an optical path length between the display element 31 and the diffraction grating 11 is set to be smaller than that between the diffraction gratings 11 and 35, so that the apparatus is made compact and a viewing zone of the pupil 51 is widened.

When the position of the pupil 51 is changed to a pupil position 52 or 53, the center wavelength of the light beam diffracted by the diffraction grating 35 and incident on the pupil is also changed. In this case, when the diffraction device 100 of the present invention is used, a clear image can be obtained.

Figure 7:
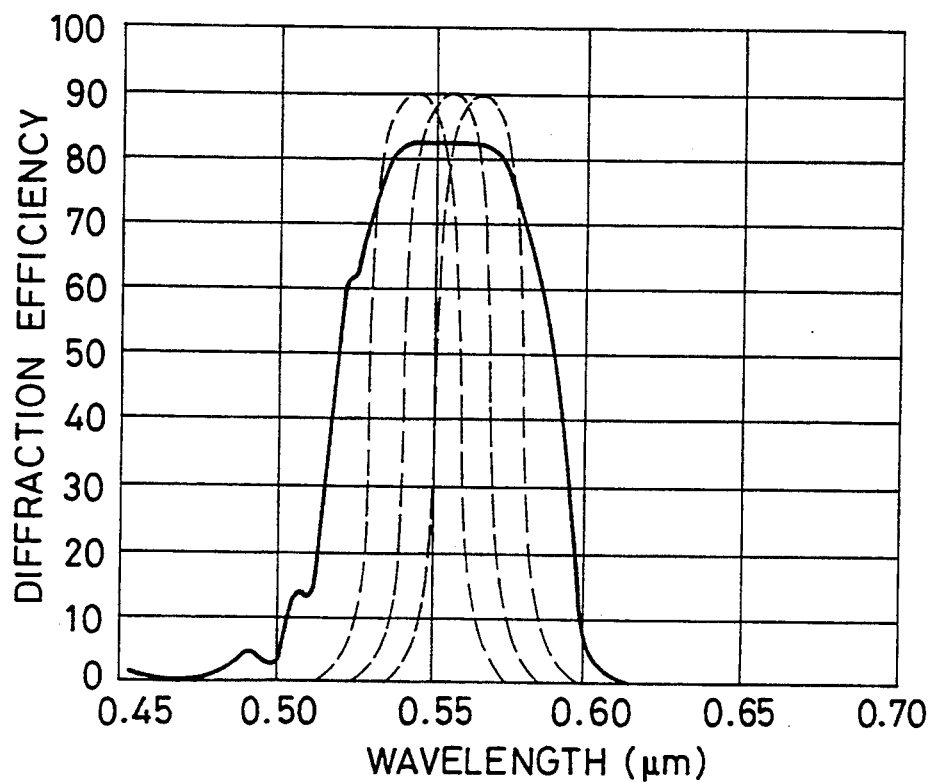
FIG. 7 is a graph showing the relationship of wavelength characteristics of diffraction efficiencies of two holograms in the apparatus shown in FIG. 6.

FIG. 7 shows the relationship of wavelength characteristics of diffraction efficiencies of the primary diffracted light beams from the diffraction gratings 35 and 11 of the diffraction device 100 in the head-up display apparatus shown in FIG. 6. Assume that the position of the pupil 51 of the observer is largely changed by ±90 mm in the vertical direction according to the setting height and position of the observer (driver), and the center wavelength (555 nm) of a light beam diffracted by the diffraction grating 35 and incident on the pupil is varied between 545 nm and 565 nm.

The wavelength characteristics of the diffraction efficiency of the diffraction grating 35 in this case are indicated by dotted curves in FIG. 7. In this case, since the diffraction efficiency of the diffraction grating 11 has flat characteristics and the full-width of wavelength at half maximum of the diffraction efficiency is larger than that of the diffraction grating 35, a uniform and bright display can be attained regardless of the pupil position.

Another method of preparing the diffraction device 100 of the present invention will be described below with reference to FIG. 8. A light beam having a wavelength of 457.9 nm from an argon laser 1 is diffused by a microscope objective lens 6, and is collimated to a parallel beam 7 by a collimator lens 12. A hologram photosensitive layer 11 formed on the transparent substrate 10 is placed in a vessel 14 storing an index matching solution 15. A window 13 is formed at an incident position of the parallel beam. The parallel beam 7 is incident on the hologram photosensitive material 11 through the transparent substrate 10, and is reflected by a reflecting mirror 16 arranged behind the substrate 10 to be re-incident on the hologram photosensitive material 11. The two light beams, i.e., incident and re-incident light beams, interfere with each other to form interference fringes.

Figure 8:
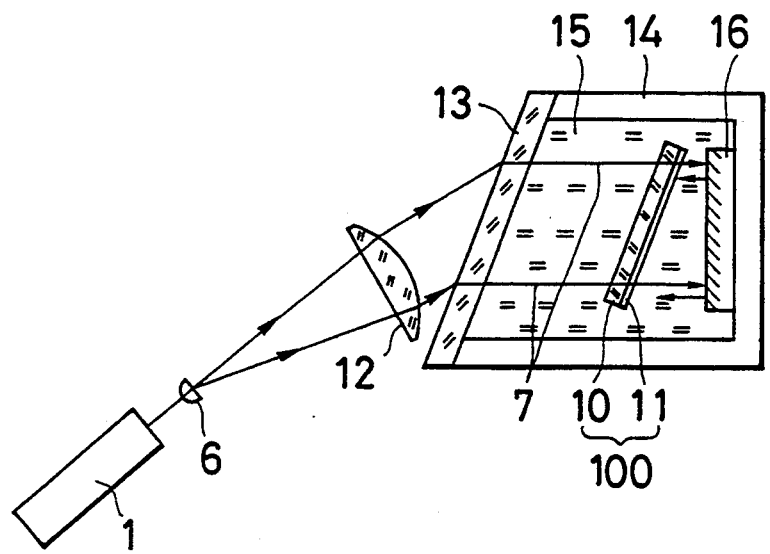
FIG. 8 is a view showing another printing optical system for forming the diffraction device of the present invention by the holographic method.

In the optical system shown in FIG. 8, an inclination angle of a grating formed on the photosensitive material 11 by the interference fringes can be adjusted by adjusting an inclination angle of the hologram substrate 10. When the type of the laser 1 is changed, a wavelength used can be variously changed.

Figure 9:
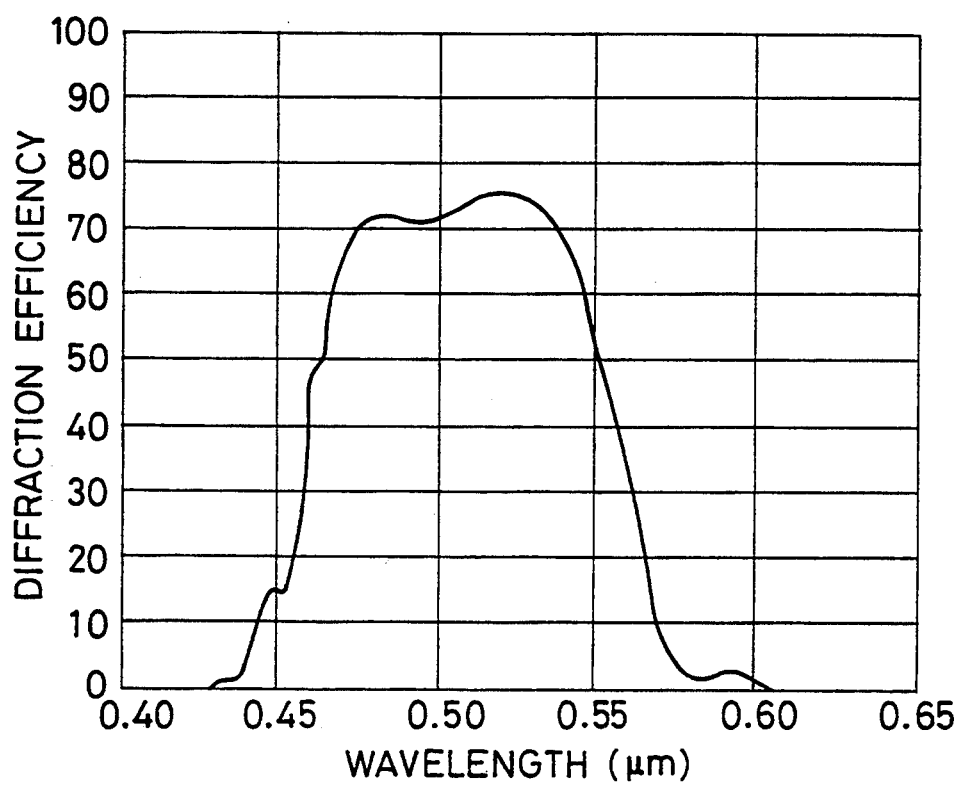
FIG. 9 is a graph for explaining wavelength characteristics of a diffraction efficiency of a diffraction device according to a second embodiment of the present invention.

FIG. 9 shows wavelength characteristics of the diffraction efficiency of the diffraction device of the present invention which is obtained such that a hologram recording material 11 containing poly(N-vinyl carbazole) as a major component is coated on a transparent substrate 10 to have a thickness of 5 μm, is exposed through the optical system shown in FIG. 8, and is developed at a developing temperature of 32° C.

In this embodiment, since almost no polarization characteristics are caused and a high diffraction efficiency can be exhibited for light in a wide wavelength range, a diffraction device comprising a reflection type diffraction grating suitable for an apparatus using natural light as a light source, e.g., the above-mentioned head-up display can be obtained.

Figure 10:
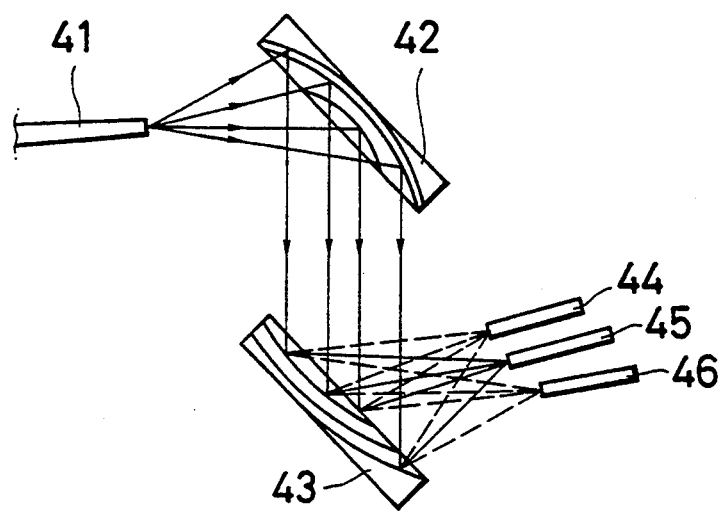
FIG. 10 is a view showing an optical fiber coupler using the diffraction device of the present invention.

FIG. 10 shows an optical fiber coupler using a pair of diffraction devices of the present invention. A light beam emitting from an optical fiber 41 and including light components of many wavelengths is reflected and diffracted by a first hologram lens element (diffraction device) 42 to be converted to a substantially parallel beam. The parallel beam is incident on a second hologram lens element (diffraction device) 43. In the first hologram lens element 42, since the grating has an inclination angle of 0° at its central portion, the reflected/diffracted light propagates in an identical direction regardless of wavelengths. In the second hologram lens element 43, since the grating is inclined, the diffraction direction differs in accordance with the wavelengths of light components, and the light components are incident in different optical fibers 44, 45, and 46.

In this embodiment, since a pair of hologram lens elements 42 and 43 comprising reflecting type diffraction gratings formed on parallel flat plates (not shown) are used, an optical fiber coupler can be realized. Since the diffraction device of the present invention can have considerably wider wavelength characteristics than that (e.g., full-width of wavelength at half maximum=15 nm) of the conventional reflection type volume-phase diffraction grating, an optical fiber coupler which can be used in a wide wavelength range of 0.78 μm to 0.85 μm can be realized.

The diffraction device of the present invention has a diffraction grating in which a full-width of wavelength at half maximum of a diffraction efficiency of light diffracted thereby is 8% or more of the value of the center wavelength of the diffracted light in place of the conventional diffraction grating. Thus, a high diffraction efficiency can be obtained with respect to light in a wide wavelength range independently of polarized light. In addition, even when an angle defined by incident light and diffracted light is large, the diffraction device which is free from a decrease in diffraction efficiency and has very excellent characteristics can be obtained. When the diffraction device of the present invention is combined with the head-up display apparatus or an optical. Eiber coupler, a great practical advantage can be provided.

We claim:

1. A head-up display apparatus, comprising:
a displaying device for displaying an image; and
an optical system for directing a beam indicative of said image from said displaying device to a viewer, said optical system including:
a beam combiner; and
a relay member for diffracting said beam and making it incident on said beam combiner, at which the beam is rediffracted and directed to the viewer, wherein a half-width of a wavelength spectrum of a diffraction efficiency of said relay member is set to be equal to or greater than 8% of a central wavelength of the wavelength spectrum, and
wherein a half-width of a wavelength spectrum of a diffraction efficiency of said beam combiner is smaller than that of said relay member.

2. An apparatus according to claim 1, wherein said beam combiner comprises volume-phase type hologram.

3. An apparatus according to claim 2, wherein said volume-phase type hologram causes said beam to be reflectively diffracted.

4. An apparatus according to claim 3, wherein said member includes a volume-phase type hologram.

5. An apparatus according to claim 4, wherein said volume-phase type hologram of said relay member causes said beam to be reflectively diffracted.

6. An apparatus according to claim 5, wherein said volume-phase type hologram of said relay member comprises a polyvinyl carbazole.

7. An apparatus according to claim 3, wherein said volume-phase type hologram comprises a polyvinyl carbazole.

8. A system for transmitting a beam having a plurality of light wavelength components, comprising:
   a first optical fiber for supplying the beam;
   a second optical fiber for receiving the beam;
   a first member forming a first diffraction grating for receiving and diffracting the beam from said first optical fiber, wherein a half-width of a wavelength spectrum of a diffraction efficiency of said first diffraction grating is set to be equal to or greater than 8% of a central wavelength of said wavelength spectrum; and
   a second member forming a second diffraction grating for receiving and diffracting the beam from said first member and directing the beam to said second optical fiber, wherein a half-width of a wavelength spectrum of a diffraction efficiency of said second diffraction grating is smaller than that of said first diffraction grating.

9. A system according to claim 8, wherein said second optical fiber has a number of fibers which is the same as the number of light wavelength components, and each said optical fiber selectively receives one of the light wavelength components corresponding thereto.

10. A system according to claim 8, wherein at least one of said first member or said second member includes a substrate for supporting the diffraction grating forming a volume-phase type hologram.

11. A system according to claim 10, wherein said volume-phase type hologram causes the beams to be reflectively diffracted.

12. A system according to claim 10, wherein aid volume-phase type hologram comprises a polyvinyl carbazole.

13. A system for transmitting a beam having a plurality of light wavelength components from a first optical fiber to a second group of optical fibers, said system comprising:
   a first member forming a first diffraction grating for receiving and diffracting the beam from said first optical fiber, wherein a half-width of a wavelength spectrum of a diffraction efficiency of said first diffraction grating is set to be equal to or greater than 8% of a central wavelength of said wavelength spectrum; and
   a second member forming a second diffraction grating for receiving and diffracting the beam from said first member and directing the beam to said second group of optical fibers, wherein a half-width of a wavelength spectrum of a diffraction efficiency of said second diffraction grating is smaller than that of said first diffraction grating is smaller than that of said first diffraction grating.

* * * * *

UNITED STATES PATENT AND TRADEMARK OFFICE
CERTIFICATE OF CORRECTION

PATENT NO. : 5,363,220      Page 1 of 2
DATED : November 8, 1994
INVENTOR(S) : Kuwayama et al.

It is certified that error appears in the above-indentified patent and that said Letters Patent is hereby corrected as shown below:

On the title page:

[56] REFERENCES CITED:

OTHER PUBLICATIONS, "Opticl" should read --Optical--.

COLUMN 4:

Line 22, "phtalimide" should read --phthalimide--.
Line 41, "tetraiodido," should read --tetraiodide,--.

COLUMN 5:

Line 13, "mum" should read --mum $\Delta\lambda$--.
Line 15, "$(\Delta,\lambda)/\lambda_0=d/t$" should read --$\Delta\lambda/\lambda_0=d/t$--.

COLUMN 8:

Line 35, "optical. Eiber" should read --optical fiber--.
Line 55, "comprises" should read --comprises a--.

UNITED STATES PATENT AND TRADEMARK OFFICE
CERTIFICATE OF CORRECTION

PATENT NO. : 5,363,220
DATED : November 8, 1994
INVENTOR(S) : Kuwayama et al.

It is certified that error appears in the above-indentified patent and that said Letters Patent is hereby corrected as shown below:

COLUMN 10:

Line 6, "aid" should read --said--.
Line 27, "grating is smaller than that" should read --grating.--
Line 28, should be deleted.

Signed and Sealed this

Fourth Day of July, 1995

Attest:

BRUCE LEHMAN

Attesting Officer        Commissioner of Patents and Trademarks